United States Patent Office 3,397,246
Patented Aug. 13, 1968

3,397,246
STABILIZED CHLORINATED HYDROCARBONS
André Gustave Ryckaert, Uccle-Brussels, Belgium, and Charles Domen, deceased, late of Etterbeek-Brussels, Belgium, by Lucie Domen née Depauw, heir, Etterbeek-Brussels, Belgium, assignors to Solvay & Cie, Brussels, Belgium, a Belgian company
No Drawing. Continuation-in-part of application Ser. No. 323,215, Nov. 13, 1963. This application Apr. 26, 1966, Ser. No. 545,307
6 Claims. (Cl. 260—652.5)

ABSTRACT OF THE DISCLOSURE

Chlorinated hydrocarbons are stabilized by the addition of two synergistic substances, one being pyrrole, N-methylpyrrole, N-ethylpyrrole or (2-pyrryl)-trimethylsilane and the other being glycidol, glycidyl acetate, epoxycyclopentanol, 2 - methyl - 1,2-epoxypropanol-(3), 3-methoxy-1,2-epoxypropane or 3-ethoxy-1,2-epoxypropane.

---

This is a continuation-in-part of application Ser. No. 323,215, filed Nov. 13, 1963, now abandoned.

The present invention concerns a process for the stabilization of chlorinated hydrocarbons in order to prevent the decomposition of these products and the simultaneous formation of oxidation products during their manufacture, storage, or application.

It is known that, under the action of heat and oxygen, chlorinated hydrocarbons are subjected to an oxidation which is catalyzed by different agents such as light and certain metal salts, in particular the salts of iron, aluminium, and magnesium.

It has already been proposed to retard this oxidation by the addition of small quantities of various products to these chlorinated hydrocarbons, such as alcohols, phenols, epoxide compounds, basic mineral or organic products, etc. The use of pyrrole has been known for a long time; that of N-alkylpyrroles has been described in U.S. Patent No. 2,492,048.

The conjoint application of two or more stabilizers which exert a synergistic effect has also been employed. Thus, in a previous patent by the applicants (Belgian Patent No. 563,604), is was shown that the simultaneous addition of phenol, an epoxide compound and of pyrrole or a pyrrole derivative gives results better than the sum of the stabilizing activities of the three separate compounds.

It has now been found that a high synergistic activity can be obtained by the use of mixtures consisting of pyrrole or a derivative of pyrrole, as well as an epoxide compound chosen from those which contain at least one other oxygen function in their molecule. This other oxygen function may for instance be an alcohol, ester, or ether function. Pyrrole and derivatives thereof are sometimes conveniently referred to in the present specification and claims as "pyrryl compounds."

In particular, it has now been found that chlorinated hydrocarbons are stabilized highly synergistically by a mixture of a pyrryl compound selected from the group consisting of pyrrole, N-methylpyrrole, N-ethylpyrrole, and (2-pyrryl)-trimethylsilane, and an epoxide selected from the group consisting of glycidol, glycidyl acetate, epoxycyclopentanol, 2-methyl-1,2-epoxypropanol-(3), 3-methoxy-1,2-epoxypropane, and 3-ethoxy-1,2-epoxypropane.

While the synergistic mixtures of the invention are useful for the stabilization of chlorinated hydrocarbons in general, they are particularly useful for the stabilization of trichloroethylene and perchloroethylene.

The stabilizing activity of various compounds and systems of compounds employed for the purpose of improving the resistance of chlorinated hydrocarbons to decomposition is demonstrated by an accelerated laboratory test carried out as follows:

150 cc. of trichloroethylene and an aluminium sample are placed in the 300 cc. flask of a Soxhlet extraction apparatus fitted with a 65 cc. extractor. The flask is heated electrically and the trichloroethylene is rapidly brought up to the boil, so as to reflux at a constant rate while a current of oxygen is passed through the apparatus and while it is illuminated by a fluorescent lamp of the "Blue Actinic" type. During the entire duration of the test, the rate of liberation of acidic vapours is measured at the outlet from the apparatus. This rate, which is very slow at the start, suddenly becomes faster as the trichloroethylene blackens and is converted to a tar-like black mass. The resistance of the trichloroethylene to the test is measured in terms of the time, expressed in hours, which elapses between the start of the test, as soon as the sample has come to the boil, and the instant when the liberation of acid becomes very fast and exceeds $15 \times 10^{-3}$ g.-mole/hr.

Table I indicates the resistance to decomposition, determined by the foregoing test, of unstabilized trichloroethylene and of trichloroethylene which has been stabilized with various pyrryl compounds and/or epoxides. The numerical values in Table I are hours, which are determined as explained above. The values in parentheses represent the differences between the observed resistances and the sums of the resistances conferred by each constituent of a mixture taken separately, and thus indicate the presence of synergism or the presence of the converse of synergism. The latter is indicated by a negative parenthesized value and is, of course, especially undesirable.

TABLE 1

| | Mixtures of the invention, 1,500 mg./liter | | | | |
|---|---|---|---|---|---|
| | No epoxide | Glycidyl acetate | Glycidol | Epoxycyclo-pentanol | 2-methyl-1,2-epoxy-propanol-(3) |
| No pyrryl compound | 22 | 38 | 42 | 25 | 33 |
| Pyrrole, 200 mg./liter | 164 | | | 260(+71) | 329(+132) |
| N-methyl-pyrrole, 200 mg./liter | 176 | 263(+49) | 242(+24) | | 223(+14) |
| N-ethyl-pyrrole, 200 mg./liter | 253 | 579(+288) | >550(>255) | | |
| (2-pyrryl)-trimethylsilane, 200 mg./liter | 89 | | | | 134(+12) |

| | Mixtures of the invention, 1,500 mg./liter | | Mixtures comprising a simple epoxide | | |
|---|---|---|---|---|---|
| | 3-methoxy-1,2-epoxy-propane | 3-ethoxy-1,2-epoxy-propane | Epichlor-hydrin | 1,2-epoxy-butane | Diisobutylene oxide |
| No pyrryl compound | 42 | 26 | 87 | 30 | 44 |
| Pyrrole, 200 mg./liter | 220(+14) | 260(+70) | 174(−77) | 204(+10) | |
| N-methyl-pyrrole, 200 mg./liter | | | | | |
| N-ethyl-pyrrole, 200 mg./liter | | | 210(−130) | | |
| 2-pyrryl)-trimethylsilane, 200 mg./liter | | 159(+44) | 53(−123) | 81(−38) | 66(−67) |

Table I clearly indicates the very significant synergistic effect obtained when mixtures according to the invention are employed. By contrast, the last three columns show that simple epoxide compounds, i.e., those not having another oxygen function, mixed with pyrrole or its derivatives give results less than the sum of the separate effects but for one instance in which a synergistic effect is obtained, the magnitude of which, however, is less than that of the mixtures of the invention. The use of an epoxide compound containing another oxygen function with a pyrryl compound, in accordance with the invention, thus leads to unexpected results.

The stabilizing activity of various compounds and systems of compounds employed for the purpose of improving the resistance of chlorinated hydrocarbons to decomposition is further demonstrated by a second accelerated laboratory test carried out as follows:

In the 300 cc. flask of a Soxhlet extraction apparatus fitted with a 65 cc. extractor are placed 150 cc. of perchloroethylene and a 50 x 50 x 1.2 mm. test-piece taken from a cold-rolled Thomas steel having the following percent composition:

| | |
|---|---|
| C | 0.12 |
| P | 0.04 |
| S | 0.05 |
| Mn | 0.47 |
| Si | 0.01 |
| Cu | 0.04 |
| Al | 0.01 |
| N | 0.017 |

An even larger test-piece of the same steel is placed in the extractor. The flask is heated electrically and the perchloroethylene is rapidly brought up to the boil so as to reflux at a constant rate while a gentle current of oxygen is passed through the apparatus and while it is illuminated by a fluorescent lamp of the daylight type. The heating is controlled so that the extractor empties every hour. The test is stopped after 48 hours. The acidity of the perchloroethylene resulting after the above-described procedure is determined in the aqueous extract obtained by shaking one volume of perchloroethylene with an equal volume of demineralized water. The acidity is expressed in terms of milliequivalents of hydrogen chloride per liter of perchlororethylene.

Table II indicates the resistance to decomposition, determined by the last described test, of unstabilized perchloroethylene and of perchloroethylene which has been stabilized with various pyrryl compounds and/or epoxides.

other oxygen functions. The most favorable proportions are between 0.1 and 0.2 g. for the pyrryls and between 1.5 and 5 g. for the epoxides, per liter of the chlorinated hydrocarbon to be stabilized.

If desired, it is possible to add other compounds, whose use as such is already known, to the compositions of stabilizing substances which constitute the invention, in particular mineral or organic substances with an alkaline reaction which modify the initial pH of the chlorinated hydrocarbon. The addition of alcohols or phenols may also be effected without departing from the scope of the invention.

The invention is not to be construed as limited to the particular forms described in detail herein, since there are to be regarded as illustrative rather than restrictive. Thus, for example, although the stabilizing compositions according to the invention are particularly effective in the case of the stabilization of trichloroethylene and perchloroethylene, they may equally well be employed for the stabilization of other chlorinated hydrocarbons, such as carbon tetrachloride, dichloroethane, trichloroethane, and the like.

What is claimed and desired to secure by Letters Patent is:

1. A stabalized aliphatic chlorinated hydrocarbon consisting essentially of said chlorinated hydrocarbon and a stabilizing amount of a synergistic mixture of a pyrryl compound selected from the group consisting of pyrrole, N-methylpyrrole, N-ethylpyrrole, and (2 - pyrryl) - trimethylsilane and an epoxide selected from the group consisting of glycidol, glycidyl acetate, epoxycyclopentanol, 2-methyl-1,2-epoxypropanol-(3), 3 - methoxy - 1,2-epoxypropane, and 3-ethoxy-1,2-epoxypropane.

2. A stabilized chlorinated hydrocarbon according to claim 1, wherein the chlorinated hydrocarbon is trichloroethylene.

3. A stabilized chlorinated hydrocarbon according to claim 1, wherein the chlorinated hydrocarbon is perchloroethylene.

4. A stabilized chlorinated hydrocarbon according to claim 1, wherein the concentration of said pyrryl compound is about 0.05 to 0.5 gram per liter and the concentration of said epoxide is about 0.5 to 10 grams per liter.

5. Stabilized trichloroethylene according to claim 2, wherein the concentration of said pyrryl compound is about 0.05 to 0.5 gram per liter and the concentration of said epoxide is about 0.5 to 10 grams per liter.

6. Stabilized perchloroethylene according to claim 3,

TABLE II

| | 1 | 2 | 3 | 4 | 5 |
|---|---|---|---|---|---|
| Epoxide (1,500 mg./liter) | No Epoxide | Epichlorhydrin | Glycidol | 3-Methoxy-1,2-Epoxypropane | Glycidyl Acetate |
| Acidity at the end of the test, in milliequivalents of HCl/liter: | | | | | |
| No pyrryl compound | 960 | 640 | 860 | 1,110 | 1,340 |
| Pyrrole (25 mg./liter) | 168 | 4.16 | 0.90 | | |
| N-methylpyrrole (25 mg./liter) | 0.08 | 0.04 | 0 | 0.02 | 0 |

Table II further indicates the very significant synergistic effect obtained when mixtures according to the invention are employed. The second column shows that a mixture of a simple epoxide compound, i.e., one not having another oxygen function, and a pyrrole or its derivatives decreases decomposition of the perchloroethylene to a significantly lesser extent than mixtures according to the invention of epoxide compounds having another oxygen function and a pyrryl compound.

The quantities of stabilizing substances to be employed according to the invention are generally within the range of 0.05 and 0.5 g./l. for the pyrryl compounds and 0.5 to 10 g./l. for the epoxide compounds having one or more wherein the concentration of said pyrryl compound is about 0.05 to 0.5 gram per liter and the concentration of said epoxide is about 0.5 to 10 grams per liter.

References Cited

UNITED STATES PATENTS

| 2,797,250 | 6/1957 | Copelin | 260—652.5 |
| 2,371,645 | 3/1945 | Aitchison et al. | 260—652.5 |
| 2,973,392 | 2/1961 | Graham | 260—652.5 |
| 3,188,355 | 6/1965 | Petering | 260—652.5 |

LEON ZITVER, *Primary Examiner.*

M. JACOB, *Assistant Examiner.*